United States Patent
Sotosek et al.

(10) Patent No.: US 10,389,721 B2
(45) Date of Patent: Aug. 20, 2019

(54) METHODS, SYSTEMS AND APPARATUS TO PREVENT UNAUTHORIZED MODEM USE

(71) Applicant: The Nielsen Company (US), LLC, New York, NY (US)

(72) Inventors: Igor Sotosek, Portoroz (SI); Bostjan Valencic, Koper (SI)

(73) Assignee: The Nielsen Company (US), LLC, New York, NY (US)

( * ) Notice: Subject to any disclaimer, the term of this patent is extended or adjusted under 35 U.S.C. 154(b) by 179 days.

(21) Appl. No.: 15/496,834

(22) Filed: Apr. 25, 2017

(65) Prior Publication Data

US 2018/0152453 A1 May 31, 2018

Related U.S. Application Data

(60) Provisional application No. 62/427,270, filed on Nov. 29, 2016.

(51) Int. Cl.
| | |
|---|---|
| *H04L 29/06* | (2006.01) |
| *H04L 12/28* | (2006.01) |
| *H04L 12/46* | (2006.01) |
| *H04W 12/06* | (2009.01) |
| *H04W 12/08* | (2009.01) |
| *H04B 1/3816* | (2015.01) |

(52) U.S. Cl.
CPC .......... *H04L 63/10* (2013.01); *H04L 12/2801* (2013.01); *H04L 12/4625* (2013.01); *H04L 63/08* (2013.01); *H04W 12/06* (2013.01); *H04W 12/08* (2013.01); *H04B 1/3816* (2013.01)

(58) Field of Classification Search
CPC ..... H04L 63/10; H04L 63/08; H04L 12/2801; H04L 12/4625; H04W 12/06; H04W 12/08; H04B 1/3816
USPC .......................................................... 726/2
See application file for complete search history.

(56) References Cited

U.S. PATENT DOCUMENTS

| | | | |
|---|---|---|---|
| 2001/0022783 A1* | 9/2001 | Ohki | H04B 7/18506 370/338 |
| 2004/0017906 A1 | 1/2004 | Stephany | |
| 2006/0111156 A1* | 5/2006 | Choi | H04H 40/18 455/574 |
| 2008/0120713 A1* | 5/2008 | Lo | H04L 63/0823 726/10 |
| 2016/0227404 A1* | 8/2016 | Kollu | H04W 12/06 |

OTHER PUBLICATIONS

Paradan Radio, "Antenna Disconnect," copyright 2017, retrieved from, http://paradanradio.com/products/antenna-disconnect, on Feb. 1, 2017, 2 pages.

* cited by examiner

*Primary Examiner* — Michael S McNally
(74) *Attorney, Agent, or Firm* — Hanley, Flight & Zimmerman, LLC

(57) ABSTRACT

Methods and apparatus to prevent unauthorized modem use are disclosed. An example apparatus includes a locking circuit; and a host authorizer to, when a received attention (AT) command pattern from a host device matches an AT command pattern, transmit a first voltage to the locking circuit to cause the locking circuit to enable modem functionality and, when the received AT command pattern does not match the AT command pattern, transmit a second voltage to the locking circuit to cause the locking circuit to disable modem functionality.

19 Claims, 4 Drawing Sheets

METHODS, SYSTEMS AND APPARATUS TO PREVENT UNAUTHORIZED MODEM USE

FIELD OF THE DISCLOSURE

This disclosure relates generally to modem devices, and, more particularly, to methods, systems and apparatus to prevent unauthorized modem use.

BACKGROUND

Traditionally, audience measurement entities have measured audience engagement levels for media based on registered panel members. That is, a measurement entity enrolls people who consent to being monitored into a panel. The measurement entity then installs a meter to monitor those panel members to determine media (e.g., television programs, radio programs, movies, DVDs, advertisements, streaming media, websites, consumption behaviors, etc.) associated with those panel members. In some examples, the meter may include a modem device to transmit media exposure data corresponding to the panelists to the measurement entity. In this manner, the measurement entity can determine exposure metrics for different media based on the collected media measurement data.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
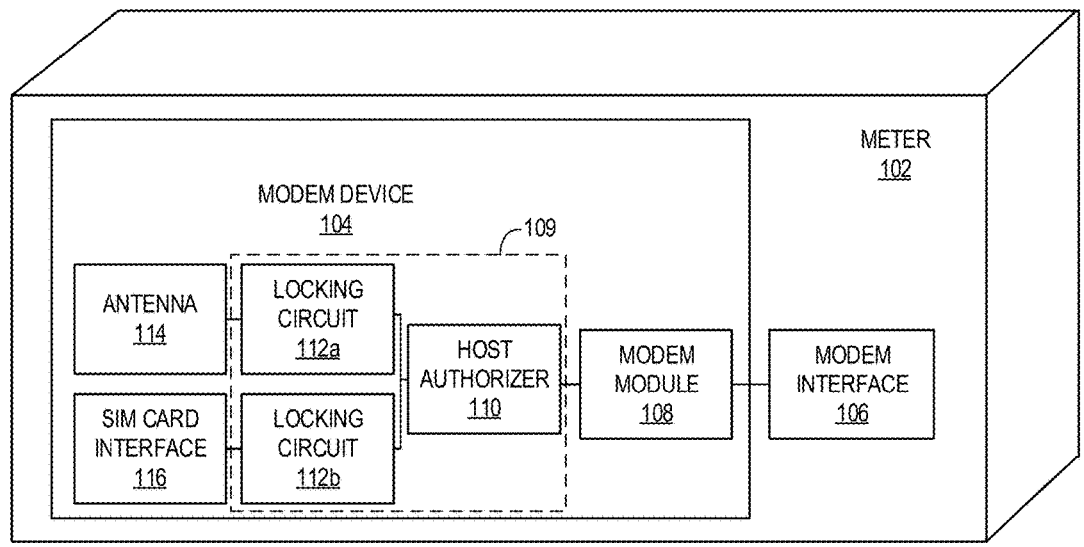
FIG. 1 is an illustration of an example modem device including an example host authorizer to control (e.g., lock or unlock) functionality of the example modem device based on attention commands in accordance with the teachings of this disclosure.

A metering device is used to monitor panelist and/or household media exposure patterns. Such a metering device is installed at a household and/or other location (e.g., restaurant, bar, etc.) of one or more people that signed up with a measurement entity to have their media exposure habits monitored. In some examples, the metering device may include a modem to establish a network connection to the measurement entity. The modem couples to the meter to receive the media exposure data from the meter and transmit the media exposure data to the measurement entity via a network (e.g., wireless) connection. To establish the network connection, the modem may include a subscriber identifier module (SIM) card and an antenna.

Because metering devices include a modem that provides a free connection to a network (e.g., the Internet), some users (e.g., panelists household members) have opened such metering devices to remove the installed SIM card and reinstall the SIM card into their own device (e.g., computer, smart phone, etc.) for free network (e.g., Internet) usage. In some examples, the users later attempt to reinstall the SIM card in the metering device after such unauthorized usage. In such examples, the unauthorized user may damage the SIM card, the modem, and/or the meter during the unauthorized removal and/or reinstallation. Accordingly, modem security is needed to prevent unauthorized use of a modem.

Traditional techniques for preventing unauthorized use of modem devices include securing the SIM card to the modem to make it more difficult for users to remove the SIM card and install the removed SIM card on an another (e.g., unauthorized) device. However, unauthorized users have adapted to circumvent such traditional techniques by removing the entire modem from the meter and coupling the modem to the unauthorized device. Examples disclosed herein prevent unauthorized use of modems by preventing modem functionality when the modem device is not coupled to the meter. Although examples disclosed herein are described in conjunction with a modem coupled to a meter, examples disclosed herein may be utilized with any modem coupled to any host device. In this manner, a modem may be set up to (A) only operate with authorized host devices regardless of the type of host device and (B) disable one or more modem services whenever powered down and/or decoupled from an authorized host device.

Examples disclosed herein determine if a host device (e.g., a meter or other host device connected to a modem) is authorized to use the modem based on attention (AT) commands. AT commands are instructions used to control a modem. An AT command sequence is a sequence of AT commands in a particular order. Examples disclosed herein include programming a meter or host device to output a particular AT command pattern to the modem. The example AT command pattern includes, one or more AT commands, one or more AT command sequences, and/or timing data related to the one or more AT command sequences. Example timing data includes a duration of time to receive the entire AT command sequence, timing data related to a delay (e.g., an amount of time) between one or more of the example AT commands, and/or any other data related to the timing of the one or more AT command sequences. The example modem includes one or more components to verify that the received AT command pattern from the host device is the particular AT command pattern. If the AT command pattern does not match the particular AT command pattern, the modem locks modem functionality using a locking circuit. A locking circuit is a circuit designed to enable and/or disable modem functionality by operationally coupling and/or decoupling modem functionality devices. As used herein, a modem functionality device is a device that when decoupled (e.g., removed) from the other components of the modem, disable modem functionality. For example, a modem functionality device may be an antenna, a SIM card interface, etc. Examples disclosed herein use the locking circuit to decouple one or more modem functionality devices to disable modem functionality when the modem is powered down, when the authorized host device is detached from the modem, and/or when an unauthorized host device is attached to the modem.

Because example modem functionality controllers described herein interfaces with the host device (e.g., meter) via a modem module to determine if the host device is authorized using appropriate AT commands (e.g., a particular sequence of AT commands, a particular timing sequence between the AT commands, etc.), examples disclosed herein may be utilized without changing the firmware and/or software of a modem module of the modem device. In this manner, examples disclosed herein may be implemented in any modem device by attaching the disclosed host authorizer and locking circuit(s) without adjusting modem module firmware and/or software. Additionally, because examples disclosed herein disable a modem functionality device based on AT commands (as opposed to a password or passcode), an unauthorized user will not know why disclosed modem devices do not work on non-authorized host devices. When the unauthorized user removes the modem device, all that user will observe is that the device does not connect to the network while all other functions are working fine. In this manner, using examples disclosed herein will give the impressions everything is set and working; however, the networking will not work. Thus, an unauthorized user will have less reason to hack the modem since the protection will not be obvious. This prevents and/or otherwise reduces the occurrence of unauthorized users removing the modem devices or further investigating why the modem device is not functioning.

FIG. 1 illustrates an example meter 102 (e.g., host device) coupled to an example modem device 104, the modem device 104 to provide protection from unauthorized modem use. The example meter 102 includes an example modem interface 106 to communicate with the example modem device 104. The example modem device 104 includes an example modem module 108, an example modem functionality controller 109, an example host authorizer 110, example locking circuits 112a, 112b, an example antenna 114, and an example SIM card interface 116.

The example meter 102 of FIG. 1 is a host device that may be installed at a user (e.g., panelist) location (e.g., panelist household) to monitor media exposure behavior(s) of users at a location. Although the illustrated example of FIG. 1 includes the example meter 102 coupled to the example modem device 104, the example meter 102 may alternatively be any type of host device. For example, the meter 102 may be a computer, cell phone, and/or any other host device that may be coupled to any type of modem device. In some examples, the example meter 102 monitors household media and/or household member behaviors. In some examples, the meter 102 is communicatively coupled (e.g., wired or wireless) to television, a computing device, a set-top-box, a mobile device, a tablet, and/or any other device that receives and/or presents media. In some examples, the meter 102 includes a microphone to intercept ambient audio to generate audio signatures and/or receive codes embedded in the ambient audio to monitor media exposure at a location where the example meter 102 is located. The example meter 102 is a host device that includes the example modem interface 106 to communicate with the example modem device 104. The example modem interface 106 may transmit metering data (e.g., collected media exposure data) to the example modem device 104, so that the modem device 104 can transmit the metering data to a media collection entity. Additionally, the example modem interface 106 transmits AT commands to the example modem module 108 of the example modem device 104. As described above, AT commands are instructions used to control the example modem device 104. The example modem device 104 uses one or more particular patterns related to the AT commands to determine when to lock (e.g., disable) and/or unlock (e.g., enable) the functionality of the example modem device 104.

The example modem device 104 of FIG. 1 is a device capable of establishing a network communication to transmit and/or receive data to/from another device. Although the example modem device 104 is within the example meter 102, the example modem device 104 may a device separate from the example meter 102. In such an example, the example modem device 104 may be coupled to the example meter 102 via a wired or wireless connection. In some examples, the modem device 104 includes a printed circuit board (PCB) that includes the example modem module 108, the example host authorizer 110, the example locking circuits 112a, 112b, the example antenna 114, and the example SIM card interface 116. The example modem device 104 may be any type of modem device from any manufacturer.

The example modem module 108 of FIG. 1 receives and/or otherwise retrieves the AT commands and/or other data from the example modem interface 106. The example modem module 108 executes instructions based on the received AT commands to operate the example modem device 104 (e.g., performing data exchanges). In some examples, the modem module 108 transmits the AT command sequence to the example host authorizer 110 to determine when the host (e.g., the example meter 102) is authorized to use the example modem device 104. In such examples, the modem module 108 may transmit the AT command sequence via general-purpose input/output (GPIO) pins of the modem module 108 to the example host authorizer 100 to determine whether to lock (e.g., disable) and/or unlock (e.g., enable) the functionality of the example modem device 104.

The example modem functionality controller 109 of FIG. 1 is a device that may be implemented in any type of modem device 104. The example modem functionality device enables and/or disables modem functionality using the example host authorizer 110 and the example locking circuits 112a, 112b. The example host authorizer 110 processes the signals (e.g., the AT command sequence) from the example modem module 108 to determine if the connected host device (e.g., the example meter 102) is an authorized user based on, for example, a time sequence of signals from the example modem module 108 triggered by the AT commands received from the example modem interface 106 (e.g., an AT command authorization pattern). The example particular AT command pattern is an AT command pattern that is used to authorize a host device. In this manner, when the meter 102 (e.g., a host device) transmits the particular AT command pattern to the modem device 104, the modem device 104 determines that the meter 102 is an authorized device. The host authorizer 110 processes the AT commands to verify the received AT command pattern against one or more particular AT command parameters indicative of an authorized host device. The AT command pattern includes the AT commands, the sequence of the AT commands, the delay(s) between AT commands, the total duration of the AT command sequence, the data within the AT commands, and/or any combination thereof. The example host authorizer 110 transmits instructions to the example locking circuits 112a, 112b to unlock the example locking circuits 112a, 112b when the received (e.g., detected) AT command pattern matches the particular AT command pattern (e.g., establishing a connection to the example antenna 114, the example SIM card interface 116, and/or any other device associated with functionality of the example modem device 104). The example host authorizer 110 transmits instructions (e.g., a control signal) to the example locking circuits 112a, 112b to lock the example locking circuits 112a, 112b when the received AT command pattern does not match the particular AT command pattern. In this manner, if the example modem device 104 is removed and/or decoupled from the example meter 102, the example modem device 104 will lock to prevent unauthorized use with an unauthorized device. Additionally, the example host authorizer 110 may transmit a control signal to lock the example locking circuits 112a, 112b when the example meter 102 (e.g., an authorized host) disconnects (e.g., in response to a loss in power) from the example modem module 108. In some examples, the host authorizer 110 transmits instructions to lock the example locking circuits 112a, 112b if subsequent AT commands do not correspond to particular AT command patterns. In this manner, the host authorizer 110 may periodically, scheduled, or aperiodically verify that the host (e.g., the example meter 102) is valid (e.g., authorized). The example host authorizer 110 is further described below in conjunction with FIG. 2.

The example host authorizer 110 of FIG. 1 is structured to receive signals via the example modem module 108 corresponding to the AT commands of the example meter 100. In this manner, the example modem functionality controller 109 can function to lock and/or unlock modem functionality independent of the characteristics of the example modem module 108, thereby decreasing the end device cost, power consumption, certification cost, heat dissipation, etc. associated with a controller-based design. Additionally, by being independent of the characteristics of the example modem module 108, changes to the example modem functionality controller 109 may be implemented without permission and/or adjustment from the manufacture of the example modem module 108 and the example modem 104 may be implemented on any type of modem module 108. Alternatively, however, the example host authorizer 110 may be implemented within a memory space of the example modem module 108, to save space and/or costs associated with additional hardware of a separate host authorizer.

The example locking circuits 112a, 112b of the illustrated example of FIG. 1 receive instructions (e.g., a control signal or voltage) to lock (e.g., disable) and/or unlock (e.g., enable) the functionality of the example modem device 104. In some examples, the locking circuits 112a, 112b lock and/or unlock the functionality by coupling and/or decoupling the example antenna 114, the example SIM card interface 116, and/or any other modem functionality device. In some examples, the locking circuits 112a, 112b may include a latch (e.g., a flip flop) and/or a transistor (e.g., a metal oxide semiconductor field effect transistor (MOSFET)) to couple and/or decouple the example antenna 114, the example SIM card interface 116, and/or any other modem functionality device, thereby enabling and/or disabling the functionality of the example modem device 104. In this manner, when the control signal is a first voltage (e.g., 3.3 Volts), the locking circuit(s) 112a, 112b unlock (e.g., by triggering the latch and/or enabling the MOSFET) and, when the control signal is a second voltage (e.g., 0V), the locking circuit(s) 112a, 112b lock (e.g., by resetting the latch and/or disabling the MOSFET). Although the example modem device 104 includes two locking circuits, the modem device may include any number of locking devices to lock/unlock to decouple the example antenna 114, the example SIM card interface 116, and/or any other modem functionality device. Without the connection to the example antenna 114 and/or the example SIM card interface 116, the example modem device 104 will not function. Accordingly, decoupling the example antenna 114 and/or the example SIM card interface 116 disables the example modem device 104.

During power-up of the example modem device 104, the example modem module 108 initializes a control signal to a first voltage (e.g., 0V) associated with a locking of the example locking circuits 112a, 112b, thereby decoupling and/or maintaining the decoupling of the example antenna 114, the example SIM card interface 116, and/or any other modem functionality device. When the example meter 102 connects to the example modem device 104, the example modem interface 106 transmits a predetermined AT command sequence to the example modem module 108. The example modem module 108 forwards the commands to the example host authorizer 110 via the GPIO pins. When the example host authorizer 110 receives the commands from the example modem module 108, the example host authorizer 110 executes signals to determine and/or otherwise verify an AT command pattern indicative of authorization. If the determined AT command pattern matches a particular AT pattern, the example host authorizer 110 transmits instructions (e.g., a control signal) to unlock the example locking circuits 112a, 112b, thereby enabling the functionality of the example modem device 104. If the determined AT command pattern does not match the particular AT command pattern, the example host authorizer 110 transmits instructions to the example locking circuits 112a, 112b to maintain the lock in the example locking circuits 112a, 112b, thereby disabling the functionality of the example modem device 104. In some examples, when the host authorizer 110 includes auto-lock functionality, the example host authorizer 110 transmits a signal to lock the example locking circuits 112a, 112b if subsequent AT commands corresponding to the particular AT command pattern are not received from the example modem interface 106, via the example modem module 108, within a particular (e.g., threshold) duration of time.

Figure 2:
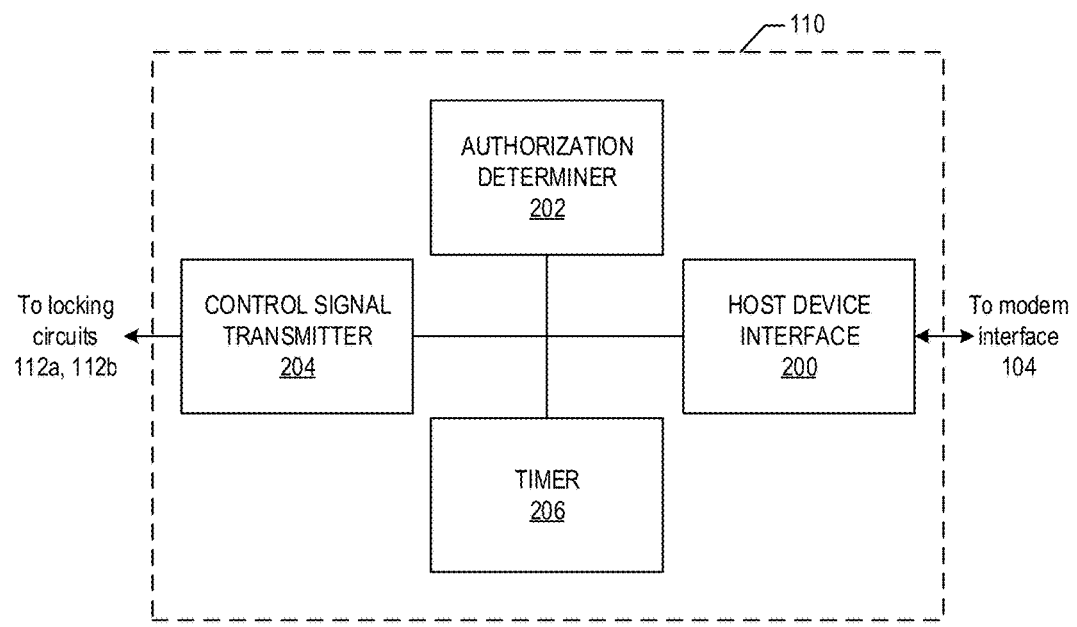
FIG. 2 is a block diagram of the example host authorizer of FIG. 1.

FIG. 2 is an example block diagram of the example host authorizer 110 of FIG. 1, disclosed herein, to prevent unauthorized use of the example modem device 104 of FIG. 1. While the example host authorizer 110 is described in conjunction with the example modem device 104 of FIG. 1, the host authorizer 110 may be utilized to prevent unauthorized use of any type of modem device. The example host authorizer 110 includes an example host device interface 200, an example authorization determiner 202, an example control signal transmitter 204, and an example timer 206.

The example host device interface 200 of FIG. 2 receives and/or otherwise retrieves signals corresponding to the AT commands from the example modem module 108 of a host device (e.g., the example modem interface 106 of FIG. 1). The signals may be received when a host device first connects to the example modem device 104, during power-up of the example modem device 104, and/or periodically, scheduled, or aperiodically after the host device has been validated.

The example authorization determiner 202 of FIG. 2 receives (e.g., detects) signals received by the example host device interface 200 to process and verify an signal pattern based on the received signals. The example authorization determiner 202 is structured to operate with one or more particular host(s) (e.g., the example meter 102) based on the particular signal pattern. For example, the authorization determiner 202 may only operate with host(s) that (A) transmit particular AT commands, (B) transmit particular AT commands in a particular sequence order, (C) transmit AT commands including particular data of interest, (D) transmit AT commands with a particular delay between two or more of the AT commands in the sequence (e.g., where each command may correspond to a different duration of delay), (E) transmit AT commands over a particular duration of time, (F) transmit AT commands including certain data, and/or (G) transmit AT commands in any other distinguishing way. In this manner, when a host device (e.g., the example meter 102 of FIG. 1) connects with the example modem device 104, the example modem device 104 will only function if the verified signal pattern (based on the receive AT commands transmitted from the host) match particular signal pattern. Accordingly, if an unauthorized user attempts to remove the modem device 104 from the example meter 102 and utilize the example modem device 104 with the user's own computer, tablet, mobile device, etc., the example modem device 104 will not function with the unauthorized device, thereby eliminating the motivation to steal or otherwise remove the modem device 104. In some examples, the authorization determiner 202 includes an auto-lock functionality that generates a control signal to lock the example locking circuits 112*a*, 112*b*, if subsequent AT commands corresponding to the particular AT command pattern are not received. The example authorization determiner 202 instructs the example control signal transmitter 204 to transmit the generated control signal to the example locking circuits 112*a*, 112*b*. The example authorization determiner 202 determines and/or otherwise calculates the delay(s) between each AT command and/or the total duration of the AT command sequence based on timing data from the example timer 206.

To determine timing data associated with the received AT commands, the example timer 206 of FIG. 2 initiates a timer when first signals corresponding to AT commands are received and/or during power-up. Additionally, the example timer 206 may flag or otherwise timestamp when each subsequent signals are received. In this manner, the example authorization determiner 202 can determine the duration of time between each signal and/or the total duration of the signals. Additionally, the example timer 206 may transmit a signal at times corresponding to the auto-lock functionality when a host device is already deemed valid to reauthorize the host device. As described above, the authorization determiner 202 may generate a control signal to lock the example locking circuits 112*a*, 112*b* if subsequent signals are not received within a time corresponding to the auto-lock functionality.

While example manners of implementing the example host authorizer 110 of FIG. 1 is illustrated in FIG. 2, elements, processes and/or devices illustrated in FIG. 2 may be combined, divided, re-arranged, omitted, eliminated, and/or implemented in any other way. Further, the example host device interface 200, the example authorization determiner 202, the example control signal transmitter 204, the example timer 206, and/or, more generally, the example host authorizer 110 of FIG. 2, may be implemented by hardware, machine readable instructions, software, firmware and/or any combination of hardware, machine readable instructions, software and/or firmware. Thus, for example, any of the example host device interface 200, the example authorization determiner 202, the example control signal transmitter 204, the example timer 206, and/or, more generally, the example host authorizer 110 of FIG. 2 could be implemented by analog and/or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example host device interface 200, the example authorization determiner 202, the example control signal transmitter 204, the example timer 206, and/or, more generally, the example host authorizer 110 of FIG. 2 is/are hereby expressly defined to include a tangible computer readable storage device or storage disk such as a memory, a digital versatile disk (DVD), a compact disk (CD), a Blu-ray disk, etc. storing the software and/or firmware. Further still, the example host authorizer 110 of FIG. 2 includes elements, processes and/or devices in addition to, or instead of, those illustrated in FIGS. 1 and/or 2, and/or may include more than one of any or all of the illustrated elements, processes and devices.

Figure 3:
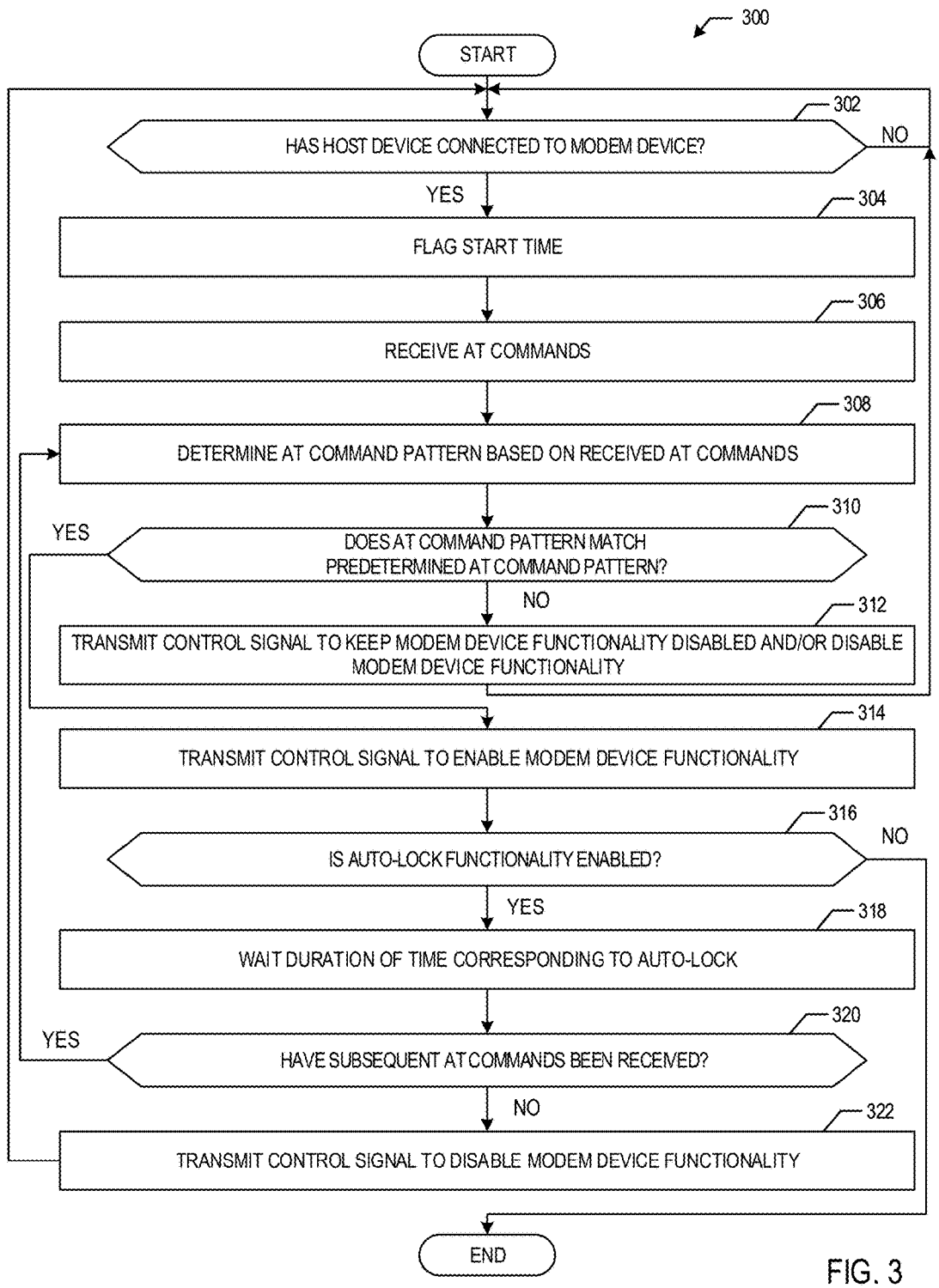
FIG. 3 is a flowchart representative of example machine readable instructions that may be executed to implement the example host authorizer of FIGS. 1 and/or 2 to control (e.g., enable or disable functionality) of the example modem device of FIGS. 1 and/or 2.

A flowchart representative of example machine readable instructions for implementing the example host authorizer 110 of FIGS. 1 and 2 is shown in FIG. 3. In the examples, the machine readable instructions comprise a program for execution by a processor such as the processor 412 shown in the example processor platform 400 discussed below in connection with FIG. 4. The program may be embodied in machine readable instructions stored on a tangible computer readable storage medium such as a CD-ROM, a floppy disk, a hard drive, a digital versatile disk (DVD), a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example host authorizer 110 of FIGS. 1 and 2 may alternatively be used. For example, the order of execution of the blocks may be changed, and/or some of the blocks described may be changed, eliminated, or combined.

As mentioned above, the example process of FIG. 3 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 3 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is an example flowchart 300 representative of example machine readable instructions that may be executed by the example host authorizer 110 of FIGS. 1 and 2 to prevent unauthorized use of the example modem device 104 of FIG. 1. Although the instructions of FIG. 3 are described in conjunction with the example host authorizer 110 of FIGS. 1 and 2, the example instructions may be utilized by any type of host authorizer in any type of modem device.

At block 302, the example authorization determiner 202 determines if a host device (e.g., the example meter 102 of FIG. 1) is connected to the example modem device 104 of FIG. 1. The example authorization determiner determines that the example meter 102 is connected to the example modem device 104 based on data received from the example modem module 108 via the example host device interface 200. If the example authorization determiner 202 determines that the host device (e.g., the example meter 102) is not connected to the example modem device 104 (block 302: NO), the authorization determiner 202 waits until a host device is connected to the example modem device 104. If the example authorization determiner 202 determines that the host device is connected to the example modem device 104 (block 302: YES), the example timer 206 flags the start time corresponding to when the host has connected to the example modem device 104 (block 304).

At block 306, the example host device interface 200 receives the signals corresponding to AT commands from the example modem module 108. The modem module 108 receives the AT commands from example modem interface 106 of the host device (e.g., the example meter 102). As described above in conjunction with FIG. 2, while the example host device interface 200 receives the AT commands, the example timer 206 flags (e.g., marks, timestamps, etc.) each AT command. In this manner, the example authorization determiner 202 can determine timing data associated with the AT commands (e.g., how long was the total transmission time of the AT commands, what is the delay between each AT command, etc.). At block 308, the example authorization determiner 202 determines AT command pattern based on the received AT commands. The AT command pattern includes the timing data (e.g., flagged by the example timer 206), the AT commands themselves, the order of the AT commands, and/or data within one or more of the AT commands.

At block 310, the example authorization determiner 202 determines if the received AT command sequence pattern matches a particular AT command pattern (e.g., corresponding to an authorized host device). The example authorization determiner 202 determines that the AT command pattern is valid when the AT command pattern matches a particular AT command pattern corresponding to an authorized host device. If the example authorization determiner 202 determines that the AT sequence does not match the particular AT command pattern (block 310: NO), the example control signal transmitter 204 transmits a control signal to keep modem device functionality disabled (e.g., if already disabled) and/or to disable (e.g., lock) modem device functionality (e.g., if enabled) (block 312). The example control signal transmitter 204 transmits the control signal to one or more of the example locking circuits 112a, 112b to cause the one or more of the locking circuits 112a, 112b to decouple the example antenna 114, the example SIM card interface 116, and/or any other modem functionality device to disable modem functionality. Once the example control signal transmitter 204 transmits the control signal to disable the example modem device 104, the process returns to block 302 until an authorized host device is connected to the example modem device 104.

If the example authorization determiner 202 determines that the AT command pattern does match the particular AT command pattern (block 310: YES), the example control signal transmitter 204 transmits a control signal to enable (e.g., unlock) modem device 104 functionality (block 314).

As described above, the example control signal transmitter 204 transmits the control signal to the example locking circuit 112a, 112b to decouple the example antenna 114, the example SIM card interface 116, and/or any other modem functionality device. At block 316, the example authorization determiner 202 determines if auto-lock functionality is enabled. As described above, the auto-lock functionality is a function that requires the host device to periodically, scheduled, and/or aperiodically transmit the authorized AT command pattern to the example host authorizer 110 to re-validate authorization. When the auto-lock functionality is enabled, the example authorization determiner 202 generates a control signal to lock the example locking circuits 112a, 112b after a duration of time corresponding to the auto-lock functionality when the AT pattern is not subsequently transmitted to the example host authorizer 110. If the example authorization determiner 202 determines that the auto-lock functionality is not enabled (block 316: NO), the process ends. In this manner, the functionality of the example modem device 104 remains enabled until the example modem device 104 is powered down or decoupled from the host device (e.g., the example meter 102), thereby causing the control signal transmitter 204 to transmit a control signal to lock the example locking circuits 112a, 112b. If the example modem device 104 is powered down, the example locking circuits 112a, 112b remain locked until the power returns and subsequent AT commands that match the particular AT command pattern are received from a host device. If the example authorization determiner 202 determines that the auto-lock functionality is enabled (block 316: YES), the example authorization determiner 202 waits for a duration of time corresponding to auto-lock based on the flags from the example timer 206 (block 318).

At block 320, the example authorization determiner 202 determines if subsequent AT commands been received by the example host device interface 200. If the example authorization determiner 202 determines that subsequent AT commands have been received (block 320: YES), the process returns to block 308 to validate the host device based on the subsequent AT commands. If the example authorization determiner 202 determines that subsequent AT commands have not been received (block 320: NO), the example control signal transmitter 204 transmits a control signal to disable (e.g., lock) the example modem device 104 functionality (block 322). As described above, the example control signal transmitter 204 locks the example modem device 104 functionality by transmitting a signal to one or more of the example locking circuits 112a, 112b to decouple the example antenna 114, the example SIM card interface 116, and/or any other modem functionality device, thereby disabling the functionality of the example modem device 104. After the example modem device 104 is disabled, the process returns to block 302 to attempt to validate another device, if coupled to the example modem device 104.

Figure 4:
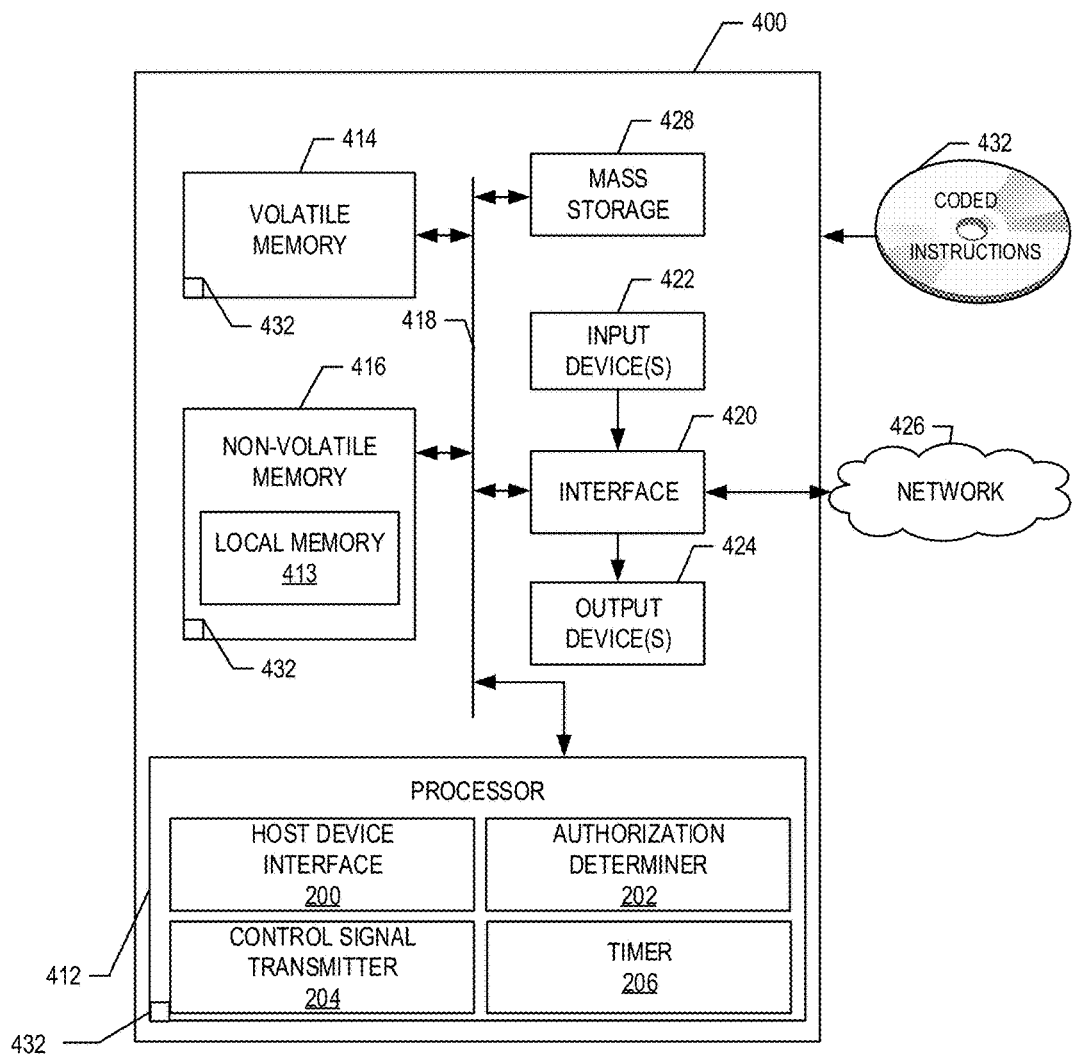
FIG. 4 is a block diagram of a processor platform structured to execute the example machine readable instructions of FIG. 3 to control the example host authorizer of FIGS. 1 and/or 2.

FIG. 4 is a block diagram of an example processor platform 400 capable of executing the instructions of FIG. 3 to implement the example host authorizer 110 of FIGS. 1 and 2. The processor platform 400 can be, for example, a server, a personal computer, a mobile device (e.g., a cell phone, a smart phone, a tablet such as an iPad™), a personal digital assistant (PDA), an Internet appliance, or any other type of computing device.

The processor platform 400 of the illustrated example includes a processor 412. The processor 412 of the illustrated example is hardware. For example, the processor 412 can be implemented by integrated circuits, logic circuits, microprocessors or controllers from any desired family or manufacturer.

The processor 412 of the illustrated example includes a local memory 413 (e.g., a cache). The example processor 412 of FIG. 4 executes the instructions of FIG. 3 to implement the example host device interface 200, the example authorization determiner 202, the example control signal transmitter 204, and the example timer 206 of FIG. 2 to implement the example host authorizer 110. The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 416 may be implemented by flash memory and/or any other desired type of memory device. Access to the main memory 414, 416 is controlled by a clock controller.

The processor platform 400 of the illustrated example also includes an interface circuit 420. The interface circuit 420 may be implemented by any type of interface standard, such as an Ethernet interface, a universal serial bus (USB), and/or a PCI express interface.

In the illustrated example of FIG. 4, one or more input devices 422 are connected to the interface circuit 420. The input device(s) 422 permit(s) a user to enter data and commands into the processor 412. The input device(s) can be implemented by, for example, a sensor, a microphone, a camera (still or video), a keyboard, a button, a mouse, a touchscreen, a track-pad, a trackball, isopoint and/or a voice recognition system.

In some examples, one or more output devices 424 may also be connected to the interface circuit 420 of the illustrated example. The output devices 424 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 420 of the illustrated example, thus, typically includes a graphics driver card, a graphics driver chip or a graphics driver processor.

The interface circuit 420 of the illustrated example also includes a communication device such as a transmitter, a receiver, a transceiver, a modem and/or network interface card to facilitate exchange of data with external machines (e.g., computing devices of any kind) via a network 426 (e.g., an Ethernet connection, a digital subscriber line (DSL), a telephone line, coaxial cable, a cellular telephone system, etc.).

The processor platform 400 of the illustrated example also includes one or more mass storage devices 428 for storing software and/or data. Examples of such mass storage devices 428 include floppy disk drives, hard drive disks, compact disk drives, Blu-ray disk drives, RAID systems, and digital versatile disk (DVD) drives.

The coded instructions 432 of FIG. 3 may be stored in the mass storage device 428, in the volatile memory 414, in the non-volatile memory 416, and/or on a removable tangible computer readable storage medium such as a CD or DVD.

From the foregoing, it would be appreciated that the above disclosed methods, systems, apparatus, and articles of manufacture prevent unauthorized modem use. Examples disclosed herein utilize characteristics of AT commands sent from a host device to verify that the host device is a valid (e.g., authorized) device to use a modem. When the host device transmits the AT commands according to a particular authorization pattern, examples disclosed herein unlock modem functionality by coupling the modem module to the antenna, SIM card, and/or any other modem functionality device. When the host device is removed and/or when the modem powers down, the modem functionality becomes locked. In this manner, when an unauthorized host device connects to the modem, the unauthorized host device will be unable to use the modem because the modem is locked and the unauthorized host device will not transmit the AT commands according to the particular authorization pattern. Using examples disclosed herein, all modem devices are protected from unauthorized use without having to implement firmware or software updates to the modem device. Instead, the modem device may be utilized with and/or otherwise integrated with the example modem functionality device to protect the modem from unauthorized users. Accordingly, example disclosed herein may be utilized in any type of modem device.

Although certain example methods, apparatus and articles of manufacture have been described herein, other implementations are possible. The scope of coverage of this patent is not limited thereto. On the contrary, this patent covers all methods, apparatus and articles of manufacture fairly falling within the scope of the claims of this patent.

What is claimed is:

1. An apparatus comprising:
   a locking circuit; and
   a host authorizer including a timer to monitor a duration of time corresponding to a first attention (AT) command pattern from a host device and a delay time between two or more AT commands in the first AT command pattern, the host authorizer to:
   when the first AT command pattern from the host device matches a second AT command pattern, transmit a first voltage to the locking circuit to cause the locking circuit to enable modem functionality; and
   when the first AT command pattern does not match the second AT command pattern, transmit a second voltage to the locking circuit to cause the locking circuit to disable modem functionality.

2. The apparatus as defined in claim 1, wherein the first AT command pattern includes at least one of the two or more AT commands, a sequence of the two or more AT commands, the duration of time corresponding to the two or more AT commands, or the delay time between the two or more AT commands in the AT command pattern.

3. The apparatus as defined in claim 1, wherein the locking circuit is coupled to at least one of an antenna or a subscriber identifier module (SIM) card interface.

4. The apparatus as defined in claim 3, wherein the locking circuit is to disable modem functionality by decoupling the at least one of the antenna or the SIM card interface.

5. The apparatus as defined in claim 3, further including a host device interface to receive a signal corresponding to the first AT command pattern from a modem module connected to the host device, the host authorizer to transmit the second voltage to the locking circuit when the host device is disconnected from the modem module.

6. The apparatus as defined in claim 1, wherein the second AT command pattern corresponds to an authorized AT command pattern.

7. A method comprising:
monitoring a duration of time corresponding to a first attention (AT) command pattern from a host device and a delay time between two or more AT commands in the first AT command pattern;
when the first AT command pattern from the host device matches a second AT command pattern, transmitting a first voltage to a locking circuit to cause the locking circuit to enable modem functionality; and
when the first AT command pattern does not match the second AT command pattern, transmitting a second voltage to the locking circuit to cause the locking circuit to disable modem functionality.

8. The method as defined in claim 7, wherein the first AT command pattern includes at least one of the two or more AT commands, a sequence of the AT commands, the duration of time corresponding to the two or more AT commands, or the delay time between the two or more AT commands in the AT command pattern.

9. The method as defined in claim 7, further including coupling the locking circuit to at least one of an antenna or a subscriber identifier module (SIM) card interface.

10. The method as defined in claim 9, further including disabling the modem functionality by decoupling the at least one of the antenna or the SIM card interface.

11. The method as defined in claim 7, further including receiving a signal corresponding to the first AT command pattern from a modem module connected to the host device and transmitting the second voltage to the locking circuit when the host device is disconnected from the modem module.

12. The method as defined in claim 7, wherein the second AT command pattern corresponds to an authorized AT command pattern.

13. A computer readable storage medium comprising instructions which, when executed, cause a machine to at least:
monitor a duration of time corresponding to a first attention (AT) command pattern from a host device and a delay time between two or more AT commands in the first AT command pattern;
when the first AT command pattern from the host device matches a second AT command pattern, transmit a first voltage to a locking circuit to cause the locking circuit to enable modem functionality; and
when the first AT command pattern does not match the second AT command pattern, transmit a second voltage to the locking circuit to cause the locking circuit to disable modem functionality.

14. The computer readable storage medium as defined in claim 13, wherein the first AT command pattern includes at least one of the two or more AT commands, a sequence of the two or more AT commands, the duration of time corresponding to the two or more AT commands, or the delay time between the two or more AT commands in the AT command pattern.

15. The computer readable storage medium as defined in claim 13, wherein the locking circuit is coupled to at least one of an antenna or a subscriber identifier module (SIM) card interface.

16. The computer readable storage medium as defined in claim 15, wherein the instructions cause the machine to disable modem functionality by decoupling the at least one of the antenna or the SIM card interface.

17. The computer readable storage medium as defined in claim 13, wherein the instructions cause the machine to:
receive a signal corresponding to the first AT command pattern from a modem module connected to the host device; and
transmit the second voltage to the locking circuit when the host device is disconnected from the modem module.

18. The computer readable storage medium as defined in claim 13, wherein the AT command pattern includes at least one of the two or more AT commands, a sequence of the two or more AT commands, the duration of time corresponding to the two or more AT commands, or the delay time between the two or more AT commands in the AT command pattern.

19. The computer readable storage medium as defined in claim 13, wherein the second AT command pattern corresponds to an authorized AT command pattern.

* * * * *